United States Patent [19]

D'Haenens et al.

[11] Patent Number: 5,874,489
[45] Date of Patent: Feb. 23, 1999

[54] NONSTICK FINISH FOR MOLDING ARTICLES

[75] Inventors: Luc Germain Pierre Joseph D'Haenens; Kenji Kiwa, both of Yokohama, Japan

[73] Assignee: E. I. du Pont de Nemours and Company, Wilmington, Del.

[21] Appl. No.: 944,994

[22] Filed: Oct. 7, 1997

Related U.S. Application Data

[60] Provisional application No. 60/028,536, Oct. 15, 1996.

[51] Int. Cl.$^6$ ........................................... C08K 9/00

[52] U.S. Cl. ........................ 523/205; 523/206; 523/209; 523/210; 523/216; 523/217

[58] Field of Search ...................................... 523/205, 206, 523/209, 210, 216, 217

[56] References Cited

U.S. PATENT DOCUMENTS

| | | | |
|---|---|---|---|
| 3,956,000 | 5/1976 | Kuhls et al. | 106/270 |
| 4,239,879 | 12/1980 | Fabris et al. | 528/76 |
| 4,244,912 | 1/1981 | Battice | 264/338 |

FOREIGN PATENT DOCUMENTS

| | | | |
|---|---|---|---|
| WO 95/23829 | 3/1995 | WIPO | C08L 81/00 |

*Primary Examiner*—Edward J. Cain

[57] ABSTRACT

A nonstick coating compositions for mold surfaces is disclosed which coatings have superior release properties and impart a matte finish to the molded article and maintain these performance characteristics over protracted periods of use. The disclosed coating composition comprises a filled fluoropolymer and polymer binder, where the filled fluoropolymer comprises an inorganic filler particle which is wholly or partially encapsulated by a fluoropolymer powder which composition when applied to a mold surface produces a surface profile with an average roughness Ra of 1 to 15 microns after spraying and curing.

14 Claims, No Drawings

NONSTICK FINISH FOR MOLDING ARTICLES

RELATED APPLICATION

This application is a continuation of U.S. Provisional patent application Ser. No. 60/028,536, filed Oct. 15, 1996.

FIELD OF THE INVENTION

This invention relates to a release coating for molded articles formed from natural or synthetic rubbers, such as athletic shoe soles and other articles.

BACKGROUND OF THE INVENTION

In the molding industry, silicone or fluoropolymer resins or chrome plating are commonly used to coat molds and provide for ease of release of molded parts. U.S. Pat. No. 4,244,912 (Battice) describes a molding process in which mold surfaces are treated with certain curable silicone release compositions in the production of high resiliency polyurethane foam cushions, shoe soles and polyester boat hulls.

An example is provided in U.S. Pat. No. 4,239,879 (Fabris et al.) where molds are coated with fluorocarbon resin, such as polytetrafluoroethylene, in the production of shoe soles and heels, energy absorbing bumpers and other automotive items from polyurethanes. However, with the advent of more intricately textured molding patterns, designs using multiple colors and the preference for matte or roughened surface textures in some industries, such as the shoe industry, conventional PTFE coatings have been found to be less than satisfactory.

Various solutions have been proposed to achieve the desired matte finish: (1) mechanical abrading of the mold surface, (2) mechanical roughening of mold surfaces which have been precoated with a nonstick finish, and (3) addition of solid filler material to nonstick finishes which coat the mold surfaces. These proposed solutions have not produced the desired results. Mold surfaces which are mechanically abraded lose their surface characteristics after repeated use and tend to produce glossy molded parts. Heretofore, fillers such as particles of calcium carbonate have been added to fluoropolymer nonstick finishes and have successfully imparted a matte texture to the molded article; but, have reduced the release properties of the fluoropolymer resin thereby making it necessary to use silicone oils for mold release.

However, silicone oils tend to migrate to the finished product that in turn causes a part such as the outer sole of a shoe difficult to bond to other shoe parts. To reduce this bonding problem, it has been found necessary to wash molded rubber parts in chlorine containing solvents such as trichloroethylene. Environmental and health concerns arise from exposure of employees to both silicone mist and the vapors from the chlorine containing solvents.

The disclosure of the previously identified patents is hereby incorporated by reference.

SUMMARY OF THE INVENTION

The instant invention solves problems associated with conventional processes by providing a manufacturing process having reduced chemical emissions that also provides for intricately textured molded articles which have a matte appearance and are easily separated from the mold which formed the articles. The instant invention also can eliminate the need to use silicone oils and the need for subsequent chlorine solvent washing, thereby reducing the number of process steps in molding rubber parts and resulting in a more economical manufacturing process.

The present invention provides nonstick coating compositions for mold surfaces which coatings have superior release properties, improved abrasion resistance, and impart a matte finish to the molded article.

More specifically, one aspect of the present invention provides a composition applicable as a nonstick finish on a mold surface comprising a filled fluoropolymer powder and polymer binder. The filled fluoropolymer can comprise an inorganic filler particle which is wholly or partially encapsulated by a fluoropolymer powder. The composition, when applied to a mold surface, can produce a surface profile with an average roughness Ra of about 1 to about 15 microns after spraying and curing.

In another aspect, the invention also provides a process for producing molded articles having a matte finish by coating a mold surface with a composition comprising a filled fluoropolymer powder and polymer binder, wherein the filled fluoropolymer comprises an inorganic filler particle which is wholly or partially encapsulated by fluoropolymer powder. The composition, when applied to a mold surface, can produce a surface profile with an average roughness Ra of about 1 to about 15 microns after spraying and curing.

A further aspect of the invention provides a coated substrate having a cured coating composition of from about 15 microns to about 100 microns on at least one surface and having a surface profile with an average roughness Ra of about 1 to about 15 microns where the coating composition comprises a filled fluoropolymer powder and polymer binder.

DETAILED DESCRIPTION

Preparation of the preferred filled fluoropolymer composition of the present invention is described in Japanese Patent Publication No. 54-3172 (Mitsui Fluorochemicals Ltd.) hereby incorporated by reference. The fluoropolymer component usually comprises a melt fabricable fluoropolymer. Melt fabricable fluoropolymers include tetrafluoroethylene (TFE) copolymers with one or more comonomers such as ethylene to form ETFE or perfluoroolefin, notably hexafluoropropylene (HFP) or perfluoro (alkyl vinyl) ether (PAVE), where the alkyl group contains 1 to 5 carbon atoms, with perfluoro (propyl vinyl) ether (PPVE) normally being preferred.

The molecular weight of the melt-fabricable tetrafluoroethylene copolymers is unimportant except that they be sufficient to be film forming and be able to sustain a molded shape so as to have integrity in the coating application. Typically, the melt viscosity of FEP (TFE/HFP) and PFA (TFE/PAVE) will be at least about $1 \times 10^2$ Pa.s and may range up to about $60-100 \times 10^3$ Pa.s as determined at 372° C. according to ASTM D-1238.

While the fluoropolymer component is normally melt fabricable, polytetrafluoroethylene (PTFE) and modified PTFE which are not melt fabricable may be used. By "modified PTFE," is meant PTFE containing a small amount of comonomer modifier which improves film forming capability during baking (fusing), such as perfluoroolefin, notably hexafluoropropylene (HFP) or perfluoro (alkyl vinyl) ether (PAVE), where the alkyl group contains 1 to 5 carbon atoms, with perfluoro (propyl vinyl) ether (PPVE) normally being preferred. The amount of such modifier will be insufficient to confer melt fabricability to the PTFE, generally no more than about 0.5 mole %. The PTFE, also for process experience, can have a single melt viscosity, usually at least about $1 \times 10^9$ Pa.s, but a mixture of PTFE's having different melt viscosities can also be used to form the fluoropolymer component.

Other suitable fluoropolymers that may be used in this invention include vinyl and vinylidene fluoride polymers and copolymers and chlorotrifluoroethylene polymers and copolymers, notably ethylene/chlorotriethylene (ECTFE) and propylene/chlorotriethylene (PCTFE).

The filler applicable to this invention comprises a hard filler with heat resistance of at least about 300° C. relatively, normally at least 400° C. The incorporation of the filler improves the hardness and heat resistance of the fluoropolymer composition and imparts abrasion resistance and/or scratch resistance. By heat resistant is meant that the fillers of this invention do not decompose, soften, liquefy, volatilize, or decompose at the temperatures at temperatures of less than about 400° C. The filler particles have a total surface area of less than about 15 $m^2/cm^3$, normally 0.1 to about 10 $m^2/cm^3$, and a particle size about 1 to about 50 microns. Suitable fillers which meet the above requirements include glass flake, glass bead, glass fiber, silicon carbide, zirconium silicate, silicon nitride, mica, metal flake, metal fiber, fine ceramic powders, metal oxides such as aluminum oxide, zirconium oxide mixtures thereof, among others.

The filled fluoropolymer powder composition used for the coating of this invention comprises a filler particle having an average particle size of about 1 to about 50 microns and a total surface area less than about 15 $m^2/cm^3$ which is fully or partially coated with fluoropolymer the coated particle has an average particle size of about 2 to about 150 microns, a porosity of not more than about 74%, and a total surface area of not more than about 10 $m^2/cm^3$, wherein the filler particle is present in an amount of about 1 to about 50% by volume of the total volume.

The proportion of fluoropolymer and filler in compositions of the present invention may vary but are typically in the weight ratio of from about 15:85 to about 30:70 by weight. The selected ratios are a balance between the hardness/heat resistance of the filler particle and the desired nonstick/release properties of the fluoropolymer. Because the filler of the composition is encapsulated in the fluoropolymer resin, the polymer and filler resist separation even after abrasion caused by prolonged use of a surface coated with the composition. Thus the compositions of this invention perform as a release agent, an abrasion resistant agent and are able to maintain constant properties through repeated use.

The composition of the present invention can further comprise a binder resin. The binder component comprises a polymer which is film-forming upon heating to fusion, is thermally stable, and has a sustained temperature use of at least about 140° C. A binder is well known in nonstick finishes for adhering fluoropolymer to substrates and for film-forming. The binder is generally non-fluorine containing and yet adheres to fluoropolymer. Examples of such polymers include one or more: (1) polysulfones, which are amorphous thermoplastic polymers with a glass transition temperature of about 185° C. and a sustained service temperature of about 140° C. to 160° C., (2) polyethersulfones, which are amorphous thermoplastic polymers with a glass transition temperature of about 230° C. and a sustained temperature service of about 170° C. to 190° C., (3) polyphenylene sulfides, which are partially crystalline polymers with a melting temperature of about 280° C. and a sustained temperature service of about 200° C. to 240° C., (4) polyimides and/or polyamideimides, which crosslink upon heating of the coating to fuse it which have a sustained service temperature in excess of 250° C., among others. All of these polymers are thermally stable and dimensionally stable at temperatures within their sustained service range and below, and they are wear resistant. These polymers also adhere well to clean metal surfaces. Polyimides and/or polyamideimides have been found to especially useful due to their ability to confer excellent abrasion resistance and thermal resistance to the composition.

The proportion of filled fluoropolymer powder and binder in compositions of the present invention may vary but are normally in the weight ratio of from about 25:75 to about 75:25 by weight. Any suitable method of blending the filled fluoropolymer and binder may be used which achieves an intimate mixture of the components. Typically, an organic liquid will be used as the blending medium and the binder may dissolve in the particular liquid. If not dissolved within the liquid, then the binder polymer can be finely divided which may require the polymer to be milled either before or during the blending. The resultant coating composition can comprise the filled fluoropolymer particles dispersed in the liquid medium, and the binder polymer either dispersed in the medium as finely divided particles or dissolved in the liquid medium in order to achieve the intimate mixture of the polymers desired.

The characteristics of the organic liquid will depend upon the identity of the binder polymer, and whether a solution or dispersion thereof is desired. Examples of such liquids include N-methylpyrrolidone, butyrolactone, high boiling aromatic solvents, alcohols, mixtures thereof, among others. The amount of organic liquid will depend on the flow characteristics desired for the particular coating operation.

The composition of the present invention may also optionally contain other additives such as pigments for the purpose of improving or adjusting the appearance of the composition. Non-filled fluoropolymer powders, such as PTFE micropowders as described in U.S. Pat. No. 3,956,000 and commonly assigned and copending U.S. patent application Ser. No. 08/204,933 (corresponding to PCT Publication No. WO95/23829) hereby incorporated by reference, may be added for the purpose of adjusting the release property of the composition. Typically PTFE micropowders can be added in the amounts described in the aforementioned patent documents. And if desired, finely divided fillers such as calcium carbonate may be added to increase hardness. These ingredients can be blended into the composition while blending of the filled fluoropolymer with the binder.

The compositions of the present invention may be applied by conventional processes followed by heating the coating to fuse it and drive off any liquid carrier that might be present. For example, the coating composition can be flowed, sprayed, dipped, roll coated, or otherwise applied onto a substrate surface. An example of using such materials to make a footwear article can be found in WO 9413164-A; hereby incorporated by reference. The compositions may be applied to substrates with untreated surfaces although the surfaces could be treated by conventional treatment such as grit blasting, etching, or primer treatment. The substrate can be any material which can withstand baking temperatures, such as metal and ceramics, examples of which include aluminum, carbon steel, stainless steel. The composition is applied to the substrate and baked at a temperature in the range of about 200° C. to about 400° C. for a period of from 5 to 60 minutes. The thickness of the coating on the substrate is from 15 to 100 microns.

The compositions of this invention are especially useful for the coating of molding surfaces of molding machines which produce molded articles of plastic, natural and synthetic rubbers. Examples of relatively elastic material such as rubbers of styrene butadiene, natural rubber, styrene butadiene and natural rubber blends, ethylene propylene diene monomer with styrene butadiene, carboxylated nitrile rubber, polyisoprene rubber, polyurethane, neoprene, chlorosulphonated polyethylene, thermoplastic rubber, latex, or silicone rubber, mixtures thereof, among others. The rubber may contain carbon black. The molded material may also comprise relatively inelastic material such as a plastic especially, thermoplastic polyurethane, polyamids, polyethylene, nitrile, polyvinyl chloride, ethylene vinyl acetate, polyester, polycarbonate, polypropylene, polyphenylene ether, styrene, vinyl, polyester, or chlorosulphanated polyethylene or polycarbonate. The molded article may also include a plastic that is modified with a functional moiety which is an amine, hydroxyl group, thiol group, carboxyl group, isocyanide group, epoxy group, ether group, aldehyde group, borane group, silicon group, or a derived group such as an urethane, ester, amide. The molded material can also comprise a foamed plastic produced using a chemical or physical blowing agent, e.g., aliphatic hydrocarbon or a chloro- or fluoro-derivative including somers of pentane, hexane, and heptane, fluorocarbon trichlorofluoromethane, dichlorodifluoromethane, dichlorotetrafluoromethane, monochloridifluoromethane, methylene chloride, carbon dioxide, nitrogen, sodium bicarbonate, dinitrophentamethylene-tetramine, sulphonyl hydrazide, azo dicarbonamide, p-toluenesulphonyl aomicarbazide, 5-phenyltetrazole, dilsopropylhydrazo-dicarboxylate, sodium borohydrite, or water. The decomposition temperature of the blowing agent is lowered using accelerating agent. The foam may be open or closed cell.

The molded article may include an outsole essentially all relatively elastic materials; or the outsole may be constructed to be flexible and include a traction element of relatively inelastic material in the form of a detachable cleat, means for strapping the article, at least one portion of relatively elastic material providing cushioning, and a moderator plate element also fixed to or partially encapsulated within a midsole. The outsole may also include at least a side wall about the area of the midfoot, a stability device of relatively inelastic material, and a plastic heel mounter.

The coating composition generates a coated mold surface which has good release, good abrasion resistance, retards expansion or overlap of rubber segments during molding, and produces articles having a matte finish without the use of release agents such as silicone oil. These properties of the mold surface are maintained for a relatively prolonged period of time. The coating compositions of this invention are especially useful for coating molds which produce outer soles of athletic shoes wherein a matte finish is desirable and intricately colored molding patterns are involved. With the use of such compositions on mold surfaces, rubber soles with undulating patterns and properly positioned rubber segments of varying colors are possible. That is, adjacent colored segments maintain their integrity without overlapping or slipping into other areas of the mold. The inventive coating compositions allow for an environmentally friendly molding process which can be conducted at relatively low curing temperatures with fewer processing steps, thereby resulting in an overall cost saving.

TEST METHODS

Preparation for Testing

Aluminum panels having a size of approximately 1×95×150 mm and surfaces which have not been mechanically roughened or grit blasted, having an initial surface profile of 0.25 to 0.5 microns Ra, were spray coated with a sample finish of 20 to 30 micron thickness and baked in an oven having a temperature of 345° C. for a time of 15 minutes to cure the coating. Surface profiles were determined by using known methods. Surface profiles with an average roughness Ra of 1 to 15 microns are applicable for this invention.

A piece of polyurethane rubber having a size of 3×30×30 mm was placed on the coated surface of a first aluminum panel over which was placed a second aluminum panel having a size of approximately 1×95×150 mm which surface is coated with a coating composition, designated as 420-104 sold by the DuPont Company, to form a sandwich. The sandwiched panels were placed on a press machine table PY-10EA, manufactured by Kodaira Seisakusyo, Japan, and were subjected to a temperature of 150° C. and pressure of 20 Kg/cm2 for 5 minutes. After five minutes, the pressure of the press machine was released and the sandwiched panels were removed from the press table and allowed to cool to room temperature.

Test 1 Release Test (Load)

The second or upper panel of the previously described sandwiched panels was removed to expose the pressed rubber. The edge of the pressed rubber was grasped with a metal clip and attached to a tension meter (load scale, specifically the Cylinder Tension Guage 1,000 Gram, manufactured by Ohba Instrument Works, Japan). The tension meter was pulled up into a 90 degree angle toward the panel, and the tension/load of the rubber was measured and recorded while being removed from the panel. Lower values are an indication of better release properties.

Test 2 Gloss

The gloss of the removed pressed rubber was measured at a 60 degree angle using a Gloss Checker IG-310 manufactured by Horiba Company. By "gloss" is meant the amount of specular reflection at a given light incident angle to a surface. Gloss measurement is a system of specifying numerically the perceived gloss of an object. A smaller value indicates a better matte appearance.

Test 3 Overlap Test (Size)

This length across the center of the removed pressed piece of rubber was measured after pressing. A small length is an indication of less areal or territorial expansion of the pressed rubber. Such a measure is an indication of the ability of individual portions of the molded rubber to maintain integrity and not expand into other areas of the mold causing overlap. That is, a low overlap is desirable when simultaneously molding several discrete colored portions to form an article wherein the discrete portions retain its individual characteristics.

Durability

To simulate abrasion/marring over an extended period of time, the coated surface of the aluminum panel was polished with #1500 sand paper then the tests (1)–(3) were repeated. A durable coating should maintain substantially the same level of performance as before polishing.

EXAMPLES

To measure these characteristics, coating materials were made and tested. Parts, proportions and percentages herein are by weight except where otherwise indicated. Components used for the various Examples are listed in Table 1.

TABLE 1

| Component | Description/Supplier |
|---|---|
| A | Polyamideimide (PAI) varnish "PD-10629," (PAI dissolved in N-methyl-2 pyrrolidone [NMP]) Phelps-Dodge Corp. |
| B | PES powder "ULTRASON E-2020," BASF Corp. |
| C | Silicon Carbide (SiC) powder "GC-3000," Fujimi Inc. |
| D | Glass beads "MB-20," Tosbiba Ballotine Co. |
| E | PFA powder "MP-102," DuPont Mitsui Fluorochemical Co. |
| F | PFA:SiC = 85:15 encapsulized PFA powder, average particle size 10–24 micron, DuPont Mitsui Fluorochemical Co. |
| G | PFA:SiC = 70:30 encapsulized PFA powder, average particle size 10–24 micron, DuPont Mitsui Fluorochemical Co. |
| H | PFA:Glass beads 70:30 encapsulized PFA powder, average particle size 10–24 micron, DuPont Mitsui Fluorochemical Co. |
| I | PTFE micropowder "MP-1600," E. I. du Pont de Nemours and Co. |
| J | PAI solution comprising |
| | 50.6%  PAI varnish "PD-10629," Phelps-Dodge Corp. |
| | 30.9   N-methyl-2-pyrrolidone (NMP) |
| | 18.5   Methylisobutylketone (MIBK) |
| K | Black pigment millbase comprising |
| | 18.0%  Carbon black pigment "black pearls 160" Cabot Corp. |
| | 20.0   Melamine formaldehyde resin "Resimene RF-6328," Monsanto Co. |
| | 15.0   N-butylalchol |
| | 47.0   N-methyl-2-pyrrolidone |
| L | Calcium carbonate (CaCO3) powder, Wako Chemical Co. |

Example 1

A mixture comprising the following components was formed by using a laboratory bead mill "Dispermat SL" available from VMA-Getzmann GmbH that was equipped with a milling chamber and an agitator.

| | | |
|---|---|---|
| J | PAI solution | 71.9% |
| | N-methyl-2-pyrrolidone | 4.3 |
| | Methylisobuthylketone | 2.2 |
| K | black pigment millbase | 9.5 |
| I | PTFE micropowder | 2.1 |

Example 2

A mixture comprising the following components was formed by using a mixer commercially sold as the "T. K. Homo mixer Mark II" available from Tokushu Kika Kogyo.

| | |
|---|---|
| Mixture of Example 1 | 100.0 |
| F SiC-15% filled PFA powder | 20.0 |

Example 3

A mixture comprising the following components was formed by using the T. K. Homo mixer, Mark II.

| | |
|---|---|
| Mixture of Example 1 | 100.0 |
| G SiC-30% filled PFA powder | 20.0 |

Example 4

A mixture comprising the following components was formed by using the T. K. Homo mixer, Mark II.

| | |
|---|---|
| Mixture of Example 1 | 100.0 |
| H Glassbead-30% filled PFA powder | 15.0 |

Example 5

A mixture comprising the following components was formed by using the T. K. Homo mixer, Mark II.

| | |
|---|---|
| Mixture of Example 1 | 100.0 |
| C SiC powder | 6.0 |
| E PFA powder | 14.0 |

Example 6

A mixture of the following components was formed by using the T. K. Homo mixer, Mark II.

| | |
|---|---|
| Mixture of Example 1 | 100.0 |
| C Glass beads | 6.0 |
| E PFA powder | 14.0 |

Example 7

A mixture of the following components was formed by using the T. K. Homo mixer, Mark II.

| | |
|---|---|
| Mixture of Example 1 | 100.0 |
| L Calcium carbonate (CaCO3) | 10.0 |

Example 8

| | |
|---|---|
| F SiC-15% filled PFA powder | 100.0 |

Example 9

| | |
|---|---|
| G SiC-30% filled PFA powder | 100.0 |

Example 10

| | |
|---|---|
| E PFA powder | 100.0 |

Example 11

| | |
|---|---|
| J PAI solution | 78.6 |
| G SiC-30% filled PFA powder | 30.0 |

TABLE 2

Test Results

| | Before Polishing | | | After Polishing | | |
|---|---|---|---|---|---|---|
| Example | Release Load (g) | Gloss | Overlap Size (mm) | Release Load (g) | Gloss | Overlap Size (mm) |
| 1 | 0 | 8–9 | >95 | — | — | — |
| 2 | 0 | 1 | 78 | 0 | 2 | 8.4 |
| 3 | 0 | 0 | 77 | 80 | 2 | 8.2 |
| 4 | 0 | 0 | 80 | 10 | 2 | 8.2 |
| 5 | 0 | 1 | 82 | 0 | 6–7 | 8.6 |
| 6 | 0 | 0–1 | 81 | 20 | 3–4 | 8.3 |
| 7 | 100 | 0–1 | 81 | 200 | 3–4 | 7.9 |
| 8 | 0 | 35–40 | >95 | — | — | — |
| 9 | 0 | 15–18 | >95 | — | — | — |
| 10 | 0 | 40–50 | >95 | — | — | — |
| 11 | 20 | 0 | 77 | 50 | 0 | 7.9 |

What is claimed is:

1. A nonstick composition comprising a liquid medium, filled fluoropolymer and polymer binder, where the filled fluoropolymer comprises an inorganic filler particle which is at least partially encapsulated by a fluoropolymer powder.

2. The composition of claim 1 wherein the fluoropolymer is melt fabricable.

3. The composition of claim 2 where the fluoropolymer comprises at least one member selected from the group consisting of PFA, FEP, and ETFE.

4. The composition of claim 1 wherein the fluoropolymer is non melt fabricable.

5. The composition of claim 1 wherein the fluoropolymer comprises PTFE or modified PTFE.

6. The composition of claim 1 wherein the inorganic filler comprises at least one member selected from the group consisting of glass flake, glass bead, glass fiber, silicon carbide, zirconium silicate, silicon nitride, mica, aluminum oxide, and zirconium oxide.

7. The composition of claim 1 comprising filled fluoropolymer and binder in the weight ratio proportion of from 15:85 to 30:70.

8. The composition of claim 1 wherein the liquid medium comprises at least one member selected from the group of N-methyl pyrrolidone, butyrolactone, aromatic solvents, and alcohols; and the binder comprises at least one member from the group consisting of polysulfones, polyethersulfones, polyphenylene sulfides, polyimides, and polyamideimides.

9. A process for producing molded rubber articles having a matte finish by coating a mold surface with a composition comprising a filled fluoropolymer and polymer binder, where the filled fluoropolymer comprises an inorganic filler particle which is wholly or partially encapsulated by a fluoropolymer powder which composition when applied to a mold surface produces a surface profile with an average roughness Ra of 1 to 15 microns after spraying and curing.

10. The process of claim 9 where the molded article comprises the outer sole of a shoe.

11. A coated substrate having a coating composition of from about 15 microns to about 100 microns thick on at least one surface of said substrate and having a surface profile with an average roughness Ra of about 1 to about 15 microns wherein the coating composition comprises a filled fluoropolymer and polymer binder, wherein the filled fluoropolymer comprises an inorganic filler particle which is at least partially encapsulated by a fluoropolymer.

12. The substrate of claim 11 wherein said substrate comprises a mold for producing molded rubber articles.

13. The substrate of claim 12 wherein said mold has an Ra of about 1 to about 15 microns.

14. The coated substrate of claim 1 wherein the substrate comprises at least one member selected from the group consisting of aluminum, carbon steel and stainless steel.

* * * * *

UNITED STATES PATENT AND TRADEMARK OFFICE
CERTIFICATE OF CORRECTION

PATENT NO.    : 5,874,489
DATED         : February 23, 1999
INVENTOR(S)   : Luc Germain Pierre Joseph D'Haenens, Kenji Kiwa It is certified that error appears in the above-identified patent and that said Letters Patent is hereby corrected as shown below:

<u>Column 7</u>,
Line 44, change "2.1" to -- 12. 1 --.

<u>Column 9</u>,
Table 2, rightmost col., change "8.4, 8.2, 8.2, 8.6, 8.3, 7.9, and 7.9" to -- 84, 82, 82, 86, 83, 79, and 79 --, repectively.

Signed and Sealed this

Twenty-ninth Day of January, 2002

*Attest:*

JAMES E. ROGAN
*Attesting Officer*     *Director of the United States Patent and Trademark Office*